Sept. 29, 1959  L. E. FISHER  2,906,811
DISTRIBUTION SYSTEM
Filed March 2, 1956  3 Sheets-Sheet 1
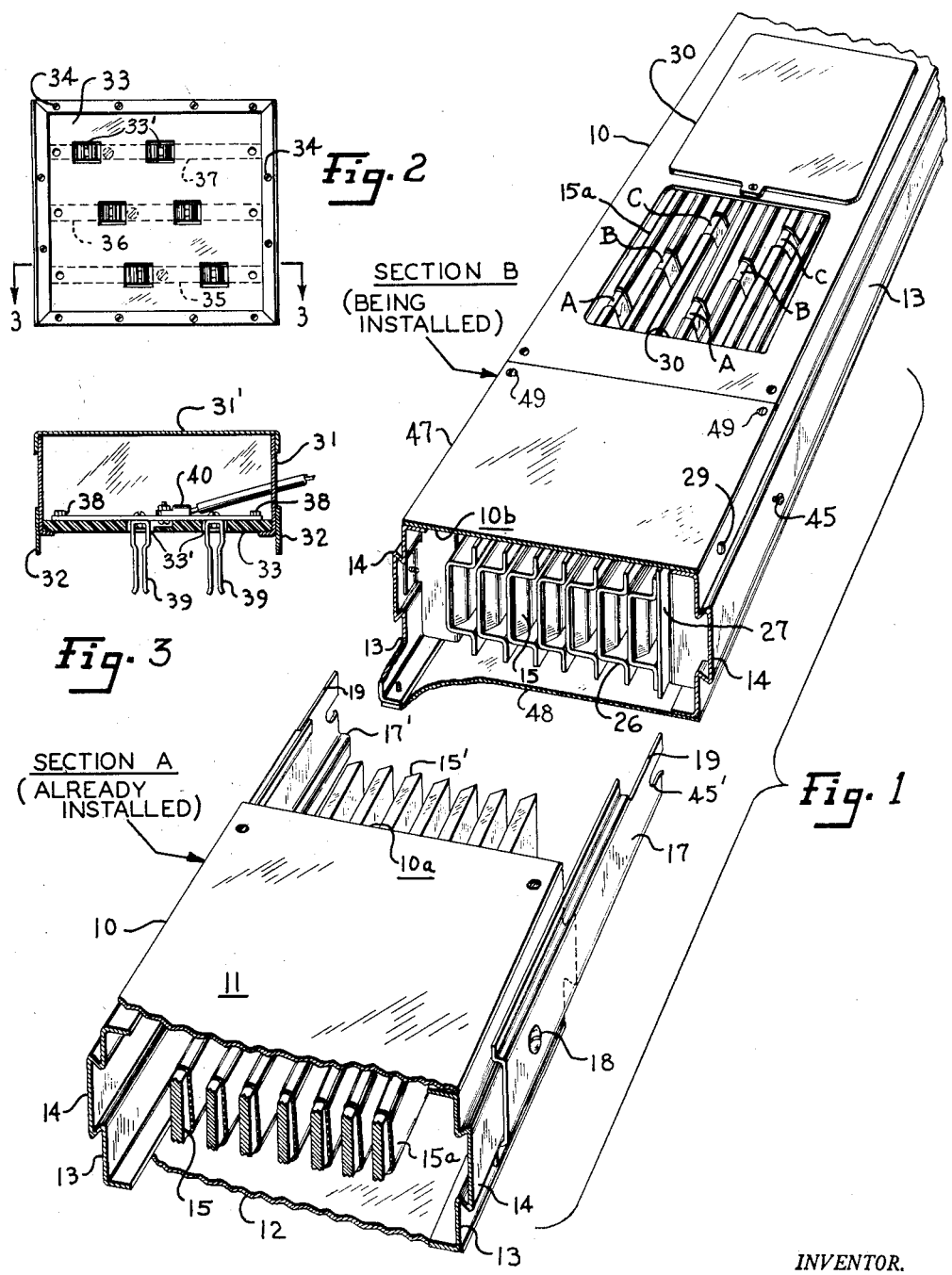
INVENTOR.
LAWRENCE E. FISHER
BY Martin Kalekow
HIS ATTORNEY

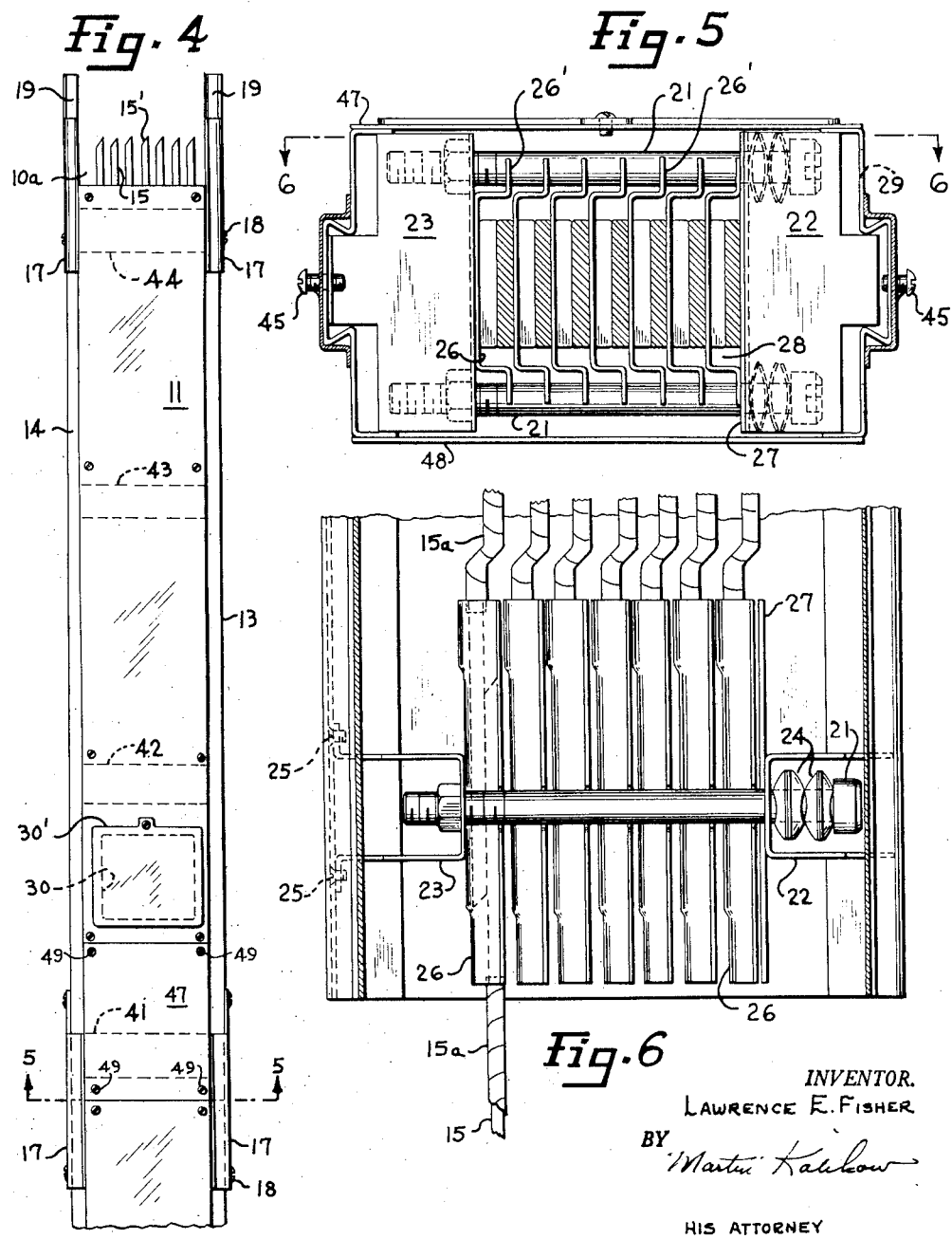

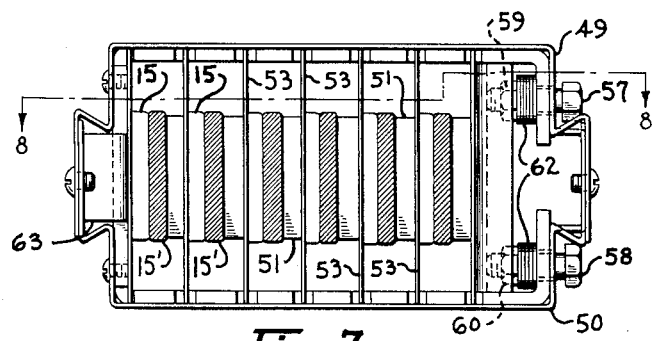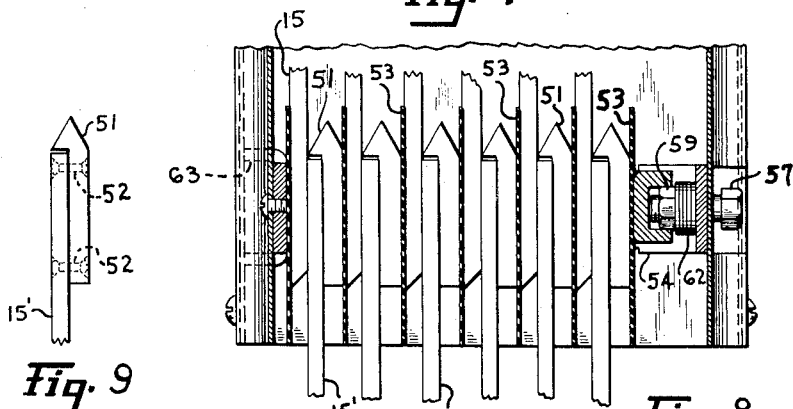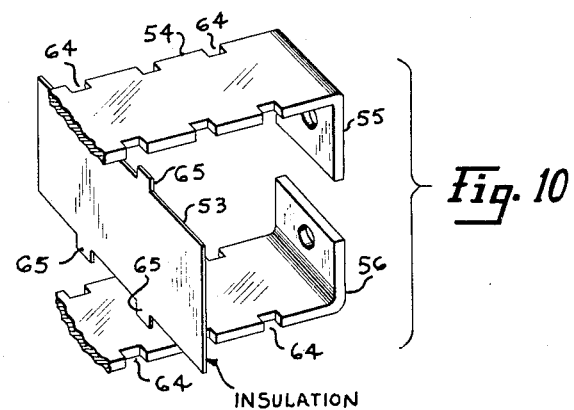

United States Patent Office 2,906,811
Patented Sept. 29, 1959

2,906,811

DISTRIBUTION SYSTEM

Lawrence E. Fisher, Southington, Conn., assignor to General Electric Company, a corporation of New York Application March 2, 1956, Serial No. 569,182

1 Claim. (Cl. 174—99)

My invention relates to electric power distribution systems of the bus bar type such as used in industrial and commercial buildings for delivering power from a substation or transformer bank to a power-consuming area, and generally referred to as "feeder" distribution systems or busways.

Feeder distribution systems of the type referred to are adapted to carry relatively large amounts of current, ranging from 600 to more than 4000 amperes and are made up of a number of pre-fabricated longitudinal sections, each containing a number of bus bars, such sections being adapted to be joined end-to-end and suspended from a wall or ceiling. The installation and interconnection of such sections of prior systems is relatively cumbersome and tedious, requiring the bolting together of a large number of individual pairs of bus bars. In a typical design, for instance, having a rating of 2500 amperes, there are 20 bars in each section, each bar requiring two bolts to connect it to the corresponding bar of the next succeeding section, making a total of 40 bolts required to be tightened at every section joint. Each of such bolts must be tightened with a pressure of approximately 2000 pounds. The maintenance of such a system also requires individual checking of this same number of fastening elements periodically. The physical positioning of each section during installation, prior to bolting together of the bus bars, is likewise relatively difficult with present systems. Thus, each section to be installed must be independently elevated and maneuvered into position with its bars overlapping and interleaved with the bars of the preceding section and carefully adjusted so that the holes of the overlapped bars are in alignment before bolting together can be accomplished.

While attempts have been made in the past to provide simpler connecting schemes, such proposed structures have not been sufficiently practicable to meet the requirements of commercial applications or to compete economically with the individually connected bus bar type.

It is an object of my invention to provide an electric power distribution system of the bus bar type in which succeeding sections may be effectively joined by a simple plug-in type of connection, supplemented by clamping bolts applying pressure to all bus bar connections simultaneously.

Another important object of my invention is to provide an electric power distribution system or busway including sections having interengaging portions adjacent their respective ends which may be used to support a portion of the weight of a section during its installation and also to guide the section into the proper installed position.

A further important object of my invention is to provide such a power distribution system in which a section may be installed or removed from the intermediate portion of a continuous run without requiring physical movement of the adjacent sections.

In carrying out my invention in one form, I provide an electric power distribution system comprising an assembly of elongated bus bars supported in generally parallel relation within a sheet metal housing to form a busway section, and insulating means surrounding the ends of the bus bars at one end of the section, the insulating means providing recesses each of which contains a bus bar end, and is also adapted to receive a corresponding bus bar end of an adjacent similar section in overlapping relation to the first bus bar end within the recess, and clamping means extending across all of the bus bar ends for clamping all of the overlapped bus bar ends together simultaneously.

According to another aspect of my invention, the section housing ends are provided with portions adapted to interengage with corresponding portions of adjacent sections to permit a guided sliding movement during the assembly of such sections as well as to support and connect the sections when completely installed.

In accordance with another important aspect of my invention, the socket-forming insulating means constitutes an assembly which may, on a proper occasion, be slid longitudinally along the bus bars in one of said sections away from the open end thereof to clear the overlapped portions of the bus bars and to permit removal or insertion of a section in the intermediate portion of a continuous run of such sections without physically disturbing the adjacent sections.

My invention will be more fully understood from the following description taken in connection with the accompanying drawings and its scope will be pointed out in the appended claim.

In the drawings,

Figure 1 is a view in perspective of the adjacent end portions of two bus bar distribution system sections made in accordance with my invention and shown in longitudinally displaced relation;

Figure 2 is a bottom plan view of a cable tap-off device for use with the distribution system of Figure 1;

Figure 3 is a sectional view taken on the line 3—3 of Figure 2;

Figure 4 is a top plan view of a distribution system section similar to those shown in Figure 1, a portion of a second section being shown connected thereto at one end;

Figure 5 is a sectional view taken along the line 5—5 of Figure 4;

Figure 6 is a view taken on the line 6—6 of Figure 5, but with the clamping bolts being shown in retracted position;

Figure 7 is a sectional view of another embodiment of my invention;

Figure 8 is a view taken on the line 8—8 of Figure 7;

Figure 9 is a detail view of a bus bar termination used in the embodiment of Figure 7;

Figure 10 is a perspective view of a portion of the clamping and insulating means used in the embodiment of Figure 7.

Referring to the drawings, I have shown my invention as embodied in an electric power distribution system including sections A and B of Figure 1. Section A represents a section of distribution system made in accordance with my invention which has already been installed and is fixedly supported by suitable hanging or supporting means (not shown). Section B represents a section of distribution system made in accordance with my invention which is in the process of being installed and which is to be connected to Section A. All of such sections are identical and each comprises an elongated generally rectangular duct or housing 10 having a top cover 11, a bottom cover 12, and sides 13. Each of the sides 13 is provided with a dovetailed intermediate section 14 for a purpose to be described. Supported within the housing in generally parallel closely spaced side-by-side arrangement by supporting and insulating means to be described, are a plurality of elongated bus bars 15.

The distribution system sections A and B are adapted to be connected together by a plug-in type of engagement, each being provided with a plug-in connecting termination at one end 10a thereof, and with a socket or stab-receiving termination at the other end 10b thereof.

It will be understood that the end (not shown) of section A opposite from end 10a is identical to the ending 10b, and that the end (not shown) of section B opposite from end 10b is identical to the ending 10a. At the socket end 10b of each section, the bus bars 15 are substantially coterminous with the housing 10 and preferably slightly shorter than the housing. At the plug-in end 10a, the bus bars 15 project a short distance beyond the end 10a of the housing 10 proper. A pair of bridging guide rails 17 are provided on the housing 10 adjacent the plug-in end 10a, projecting a short distance beyond the end 10a of the housing, and adapted to receive the dovetailed portions 14 of the adjacent section. The guide rails 17 are attached to the housing sides 13 by means of interfitting portions as shown and also by retaining screws 18. Each of the guide rails 17 includes shoulders or tracks 17' adapted to slidably support a part of the weight of the next succeeding section during the assembly operation. For the purpose of facilitating insertion of such section (such as section B) onto the guide rails 17 of section A, a portion of each of the guide rails 17 is cut away adjacent the outer end as at 19. This permits the end 10b of section B to be brought into engagement with section A by a downward vertical movement to permit initial engagement and support of said section on the tracks 17'. After the end of section B is rested on the tracks 17', it is slid therealong into assembled position, in which position the projecting bus bar ends at 10a enter the socket portion 10b and the end 10b abuts the end 10a. Also, at this time, a portion of the guide rails 17 slides under the head of screw 45 on the housing of section B, a slot 45' being provided for this purpose. The screws 45 may then be tightened completing the mechanical joining of the two sections. (It will be understood that suitable hangers or other supports, not shown, are also used to permanently support section B with respect to the building or other place of installation.)

The bus bars 15 of each section are supported within the housing 10 at a number of longitudinally spaced points such as 41, 42, 43, 44 of Figure 4, in insulated relation, by suitable supporting and insulating means such, for instance, as shown in Patent 2,576,774 issued to E. T. Carlson and assigned to the same assignee as the present invention.

The ends of the bus bars 15 are preferably offset adjacent the end 10b, as shown particularly in Figure 6, so that they make sliding overlapping engagement with the ends of the bus bars in the other section, when the sections are brought into abutting relation as described. The ends of the bus bars 15 also preferably have their ends tapered, as indicated at 15', to facilitate their insertion.

The structure of the insulating and connecting means adjacent the end 10b is shown particularly in Figures 5 and 6. The insulating and supporting means shown comprises a first generally U-shaped yoke member 23 which is releasably attached to one of the side walls 13 by mounting screws 25 (Figure 6) and a second generally U-shaped yoke member 22 adjacent the opposite side wall 13 of the housing, but not attached thereto. A pair of elongated clamping bolts 21 extend generally transversely to the bus bar section passing through the yokes 22 and 23.

A number of generally C-shaped insulators 26 are provided, each having oppositely directed flange portions 26' which are notched at an intermediate portion thereof to provide an interfitting engagement with each of the clamping bolts 21. A flat cover plate 27 is used to close the last C-shaped insulator 26. It will be seen that the assembly of the C-shaped insulator is such that a plurality of generally rectangular chambers or pockets are provided into which the ends of the bus bars 15 extend. Each of the pockets 28 is made wide enough to admit the ends of bus bars 15 of both of the sections A and B which enter in overlapping engagement therein.

After movement of the assembled sections longitudinally to fully assembled position, the clamping bolts 21 may be tightened. This is accomplished by inserting a hexagonal rod-type wrench through opening 29 in the side walls 13 into a correspondingly shaped socket in the head of the bolt 21. Dished-type spring washers 24 are provided on the rods 21 to provide resilient pressure. As the bolts 21 are tightened, the yoke member 22 is drawn toward the yoke member 23 and all of the assembled bars are compressed together so that electrical connection is made between all of the various pairs of overlapped bars at the same time.

Assembly and disassembly of sections in a given system is normally carried out in the manner described above starting from one end and continuing longitudinally in sequence with succeeding sections. Occasionally, however, it is desirable to remove or replace a section at an intermediate location of a run of an installed system for various reasons such, for instance, as to repair accidental damage to such section.

In order to make possible such dropping out of an intermediate section, I make the splice-plate guide rails 17 removable by removing screws 18, and I also provide removable top and bottom joint cover plates 47 and 48 which may be removed by removing screws 49. In addition, the joint insulating assembly comprising the bolts 21, the yokes 22 and 23 and the insulators 26 is attached to the housing only by screws 25. To drop out a section, the guide rail splice plates 17 are removed and a selected one of the joint cover plates 47 and 48 is removed, depending on the direction in which it is desired to remove the section. The clamping bolts 21 are loosened to remove clamping pressure on the insulators 26 and the screws 25 are removed, which eliminates all connection between the insulator joint assembly and the housing. The complete joint insulator assembly including the bolts 21, the yokes 22 and 23 and the insulators 26 is then slid along the bars within the housing away from the overlapped portions of the bus bars. When the insulator assembly has been moved back far enough to clear the overlapped portions of the bus bars, the two sections are then free to move at right angles to each other and, assuming that the joint at the other end of the section has likewise been released and the insulator assembly pushed back, the intermediate section may then be removed by motion at right angles to the direction of the run. Insertion of a replacement section is accomplished by reversing this procedure.

In Figures 7 through 10 I have shown another embodiment of my invention. In this embodiment the duct housing comprises two generally U-shaped interfitting members 49 and 50. The bus bars 15' are provided with tapered spacing blocks 51 mounted on the projecting ends thereof by suitable means such as by screws 52. While I have shown the spacer block 51 as comprising metallic material, it will be understood that the block 51 may, if desired, be made of suitable insulating material. Each pair of overlapped bus bars 15 and 15' is separated from the adjacent overlapped pair by a plate of insulating material 53 which is generally rectangular in outline. The assembly of overlapped bar ends is encircled by a generally C-shaped bracket 54 having its ends 55 and 56 bent inwardly and provided with holes through which pass pressure bolts 57 and 58 respectively. A number of dished-type spring washers 62 are carried by the bolts 57 and 58 between the nut and the inturned end of the bracket 54. As the bolts 57 and 58 are turned inwardly into the nuts 59 and 60, the ends of the bolts press against the pressure plate 61, pressing it against the assembly of overlapped bar ends toward the bight end of the bracket 54. The bracket 54 is also preferably provided with outwardly-bent parallel projecting portions 63 carried by the bight thereof. The insulating plates 53 and the bracket 54 have interfitting portions comprising notches 64 in the bracket 54 and projecting lug portions 65 in the insulating plates 53 whereby the insulating plates 53 are loosely held in place upon separation of the two connected sections.

Applicant's novel busway system includes features by which it is adapted to serve as a low-reactance high-capacity "feeder" type of busway whose main function is to transmit power from one predetermined location to another predetermined location, and also to serve as a "plug-in" type of busway, intermediate portions of which are adapted to serve as sockets for the reception of plug-in type power take-off connections for energizing multiple branch circuits or power consuming devices. These features are more fully set forth in applicant's application Serial Number 599,405, assigned to the same assignee as the present invention, and will be only briefly described herein.

As shown in the drawings, applicant's busway includes a number of closely-spaced bus bars, being equal in number to a multiple of the number of phase-displaced power sources or "phases" of the electrical system with which it is to be used. The embodiment illustrated is designed for use with a three-phase power system and includes double this number of bars. For the purpose of adapting at least one intermediate portion of such a system to serve as a socket for the reception of a power take-off plug, selected portions of the bus bars are left free of insulation to provide contact areas as at A—A, B—B, and C—C (Figure 1). The portions A, B and C are staggered or spaced apart longitudinally of the bus bars but similar phase bar contact areas are aligned transversely of the bars as shown. Thus there is provided a plurality of bus bar contact areas, but adjacent bus bars being insulated adjacent such contact areas. An opening 30 is provided in the housing cover 11 adjacent such bar contact areas and a cover 30' is provided to close the opening when not in use.

For the purpose of providing a power take-off device for use at such contact areas, I provide a plug-in connecting device as shown in Figures 2 and 3 and including a generally rectangular enclosure 31 having depending side flanges 32 along opposite sides thereof adapted to overlap a portion of the sides 13 of the housing 10 and to be attached thereto by suitable means such as by screws (not shown).

An insulating supporting plate 33 is mounted in the enclosure 31 by means of screws 34 through inturned flanges carried by the sides of the enclosure 31. The plate 33 thus forms the bottom wall for the enclosure 31 and is provided with a number of apertures 33', through which contact members 39 are adapted to project. The contact members 39 are arranged in pairs, each pair mounted on a common cross-connecting strap 35, 36, 37 and each pair adapted to make contact with a pair of bus bar contact areas A—A, B—B and C—C. Suitable conductor-connecting means are provided such as pressure-type connector 40 mounted on each of the straps 35, 36 and 37.

While I have shown and described only two specific embodiments of my invention, it will be apparent that many modifications thereof may be made, and I, therefore, intend, by the appended claim, to cover all such modifications as fall within the true spirit and scope of my invention.

What I claim as new and desire to secure by Letters Patent of the United States is:

An electric power distribution system apparatus including at least first and second busway sections, each of said busway sections comprising an elongated generally rectangular tubular housing, a plurality of relatively closely spaced elongated bus bars supported in insulated relation within said housing, said bus bars having end portions substantially coterminous with said housing at one end thereof and projecting a short distance beyond said housing at the other end thereof, insulating means covering said bus bars substantially entirely except at said end portions, said projecting end portions of said first busway section being adapted to be engaged in interleaved relation between the coterminous bus bar end portions of said second busway section to provide a plurality of transversely aligned overlapping pairs of bus bar end portions, means for facilitating the interengagement of such busway sections comprising a pair of guide rails carried by opposite side portions of said busway housing of one of said sections to receive side portions of said busway housing of said other section, said guide rails having a portion cut away to permit said other busway section to be moved transversely into engagement with said guide rails and thereafter slid therealong into engaged relation, a plurality of generally C-shaped insulators within said second busway section each surrounding one of said coterminous end portions, means supporting said insulators comprising a pair of clamping plates on opposite sides of said coterminous end portions, a pair of clamping bolts extending between said clamping plates above and below said bus bar end portions, said C-shaped insulators having vertically extending flanges engaging said clamping bolts, said C-shaped insulators having an offset portion of depth greater than the thickness of one of said bus bars and less than twice the thickness of one of said bus bars, whereby said insulators also provide spaces for receiving the said projecting end portions of the bus bars of said first section respectively, said projecting end portions and said coterminous end portions each having the ends thereof tapered to facilitate their entry into proper position during endwise assembly of said busway sections, said transversely extending clamping bolts having head portions within said section housing, and apertures in said side walls of said housing sections adjacent said heads of said clamping bolts to provide access to said clamping bolts to permit tightening of said clamping means from outside of said enclosure.

References Cited in the file of this patent

UNITED STATES PATENTS

| | | |
|---|---|---|
| 2,253,550 | Bohn | Aug. 26, 1941 |
| 2,274,422 | Mahoney et al. | Feb. 24, 1942 |
| 2,341,311 | Carlson | Feb. 8, 1944 |
| 2,341,841 | Carlson | Feb. 15, 1944 |
| 2,350,601 | Frank et al. | June 6, 1944 |
| 2,411,128 | Carlson | Nov. 12, 1946 |
| 2,576,774 | Carlson | Nov. 27, 1951 |
| 2,653,991 | Dyer et al. | Sept. 29, 1953 |